(12) United States Patent
Agiman (10) Patent No.: US 6,369,557 B1
(45) Date of Patent: Apr. 9, 2002

(54) ADAPTIVE LOOP RESPONSE IN SWITCH-MODE POWER SUPPLY CONTROLLERS

(75) Inventor: Dan Agiman, Irvine, CA (US)

(73) Assignee: Semiconductor Components Industries LLC, Phoenix, AZ (US)

( * ) Notice: Subject to any disclaimer, the term of this patent is extended or adjusted under 35 U.S.C. 154(b) by 0 days.

(21) Appl. No.: 09/804,336

(22) Filed: Mar. 12, 2001

(51) Int. Cl.[7] .................................................. G05F 1/56
(52) U.S. Cl. ......................... 323/282; 323/283; 323/351
(58) Field of Search ............................... 323/282, 283, 323/351

(56) References Cited

U.S. PATENT DOCUMENTS

| | | | | |
|---|---|---|---|---|
| 5,514,947 A | * | 5/1996 | Berg | 323/282 |
| 5,627,459 A | * | 5/1997 | Itoyama et al. | 323/283 |
| 5,754,414 A | * | 5/1998 | Hanington | 323/282 |
| 5,770,940 A | * | 6/1998 | Goder | 323/282 |
| 5,861,737 A | * | 1/1999 | Goerke et al. | 323/282 |
| 6,127,815 A | * | 10/2000 | Wilcox | 323/351 |
| 6,316,926 B1 | * | 11/2001 | Savo et al. | 323/283 |

* cited by examiner

Primary Examiner—Jeffrey Sterrett (57) ABSTRACT

The output terminal of an error amplifier (32) is coupled to the inverting input of a comparator circuit (34). Additionally, a clamp circuit is coupled between the output terminal of the error amplifier (32) and circuitry connected to the non-inverting input of the comparator circuit (34), to clamp the voltage there between to a predetermined voltage level. This circuit arrangement provides improved controller closed loop response that is adaptive to the power supply (10) output voltage.

20 Claims, 7 Drawing Sheets

ADAPTIVE LOOP RESPONSE IN SWITCH-MODE POWER SUPPLY CONTROLLERS

BACKGROUND OF THE INVENTION

The present invention relates to switch-mode power supply controllers. More particularly, the present invention relates to a circuit arrangement and method of providing adaptive loop response in switch-mode power supply controllers.

Most modern electronic systems employ switch-mode power supplies due to the high power efficiency and smaller physical size of these types of power supplies. Switch-mode power supplies are also advantageous in that these supplies can provide regulated output voltages having magnitudes higher or lower than the unregulated input supply, and also provide multiple outputs of differing voltage magnitudes.

Many modern electronic systems also employ microprocessors as part of the system design. As microprocessor clock speeds increase, the switching frequency of switch-mode power supplies used in conjunction with microprocessor-based systems must also increase. Thus, the error amplifiers used in the controller circuitry of many switch-mode power supply designs must also have fast response times. Of course, in addition to providing fast response times, the power supply controllers must also provide stable operation at the high clock frequencies utilized by microprocessors.

In most instances, such as steady state or slow load variations, switch-mode power supply controllers provide sufficiently stable operation. However, under certain transient conditions, such as from no-load, or low-load, to a high load condition (or vice-versa), the switch mode power supply closed loop response may be slow to react due to output voltage slew rate limitations of the error amplifier. To compensate for this potential slow response, additional capacitors are placed at the output of the power supply. These additional components both increase system cost and provide a larger power supply footprint.

One method known in the art for increasing the controller response time is to clamp the output of the error amplifier to a predetermined voltage level with respect to a reference (or ground) potential. Since the clamp voltage level is fixed in this arrangement, it must be set above the controller's oscillator/ramp peak voltage or the maximum output voltage, depending on the design, so as not to limit the maximum duty cycle of the power supply. Typically, this requires clamp voltages in the range of 2 to 8 volts. Because this clamp voltage range is fairly high, the slew time of the error amplifier output over the 2 to 8 volt range may be too high for many high speed microprocessor-based system applications.

Hence, there is a need in the art for a controller circuit design and methodology that increases the response time of the controller's error amplifier circuit without adversely affecting the controller's stability.

DETAILED DESCRIPTION OF THE DRAWINGS

Figure 1:
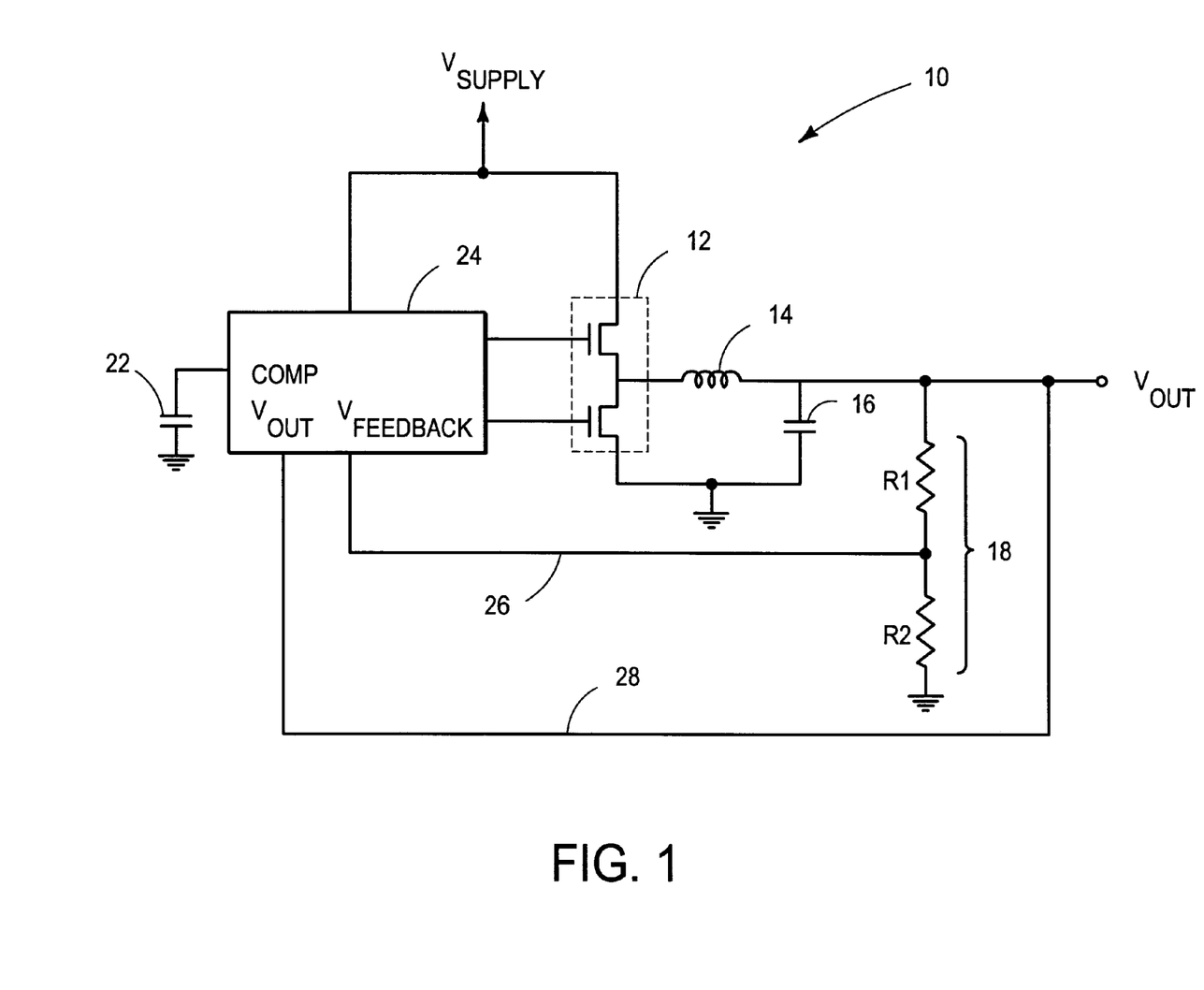
FIG. 1 is a block diagram of a general switch mode power supply.

FIG. 1 depicts a generalized block diagram of a switch mode power supply that can utilize the controller described herein. The power supply 10 includes a controlled power switch 12, an output filter that includes an inductor 14 and a capacitor 16, a voltage divider network 18, a compensation capacitor 22, and a controller 24. A feedback voltage line 26 and an output voltage line 28 are each connected to respective inputs of the controller 24. The depicted power supply 10 is only one of many generalized designs, and the controller and methodology described herein are not limited to any single generalized design.

The controller 24, which will be described in more detail herein below, receives a feedback signal ($V_{FEEDBACK}$) on the feedback voltage line 26 and an output voltage signal ($V_{OUT}$) on the output voltage line 28 and controls the switching operation of the controlled power switch 12 on the basis of these signals. Specifically, the controller circuit 24 determines the duty cycle of the controlled power switch 12. The duty cycle of the controlled power switch 12, in turn, controls the current flow through the inductor 14 and capacitor 16, and thus the output voltage magnitude.

Figure 2:
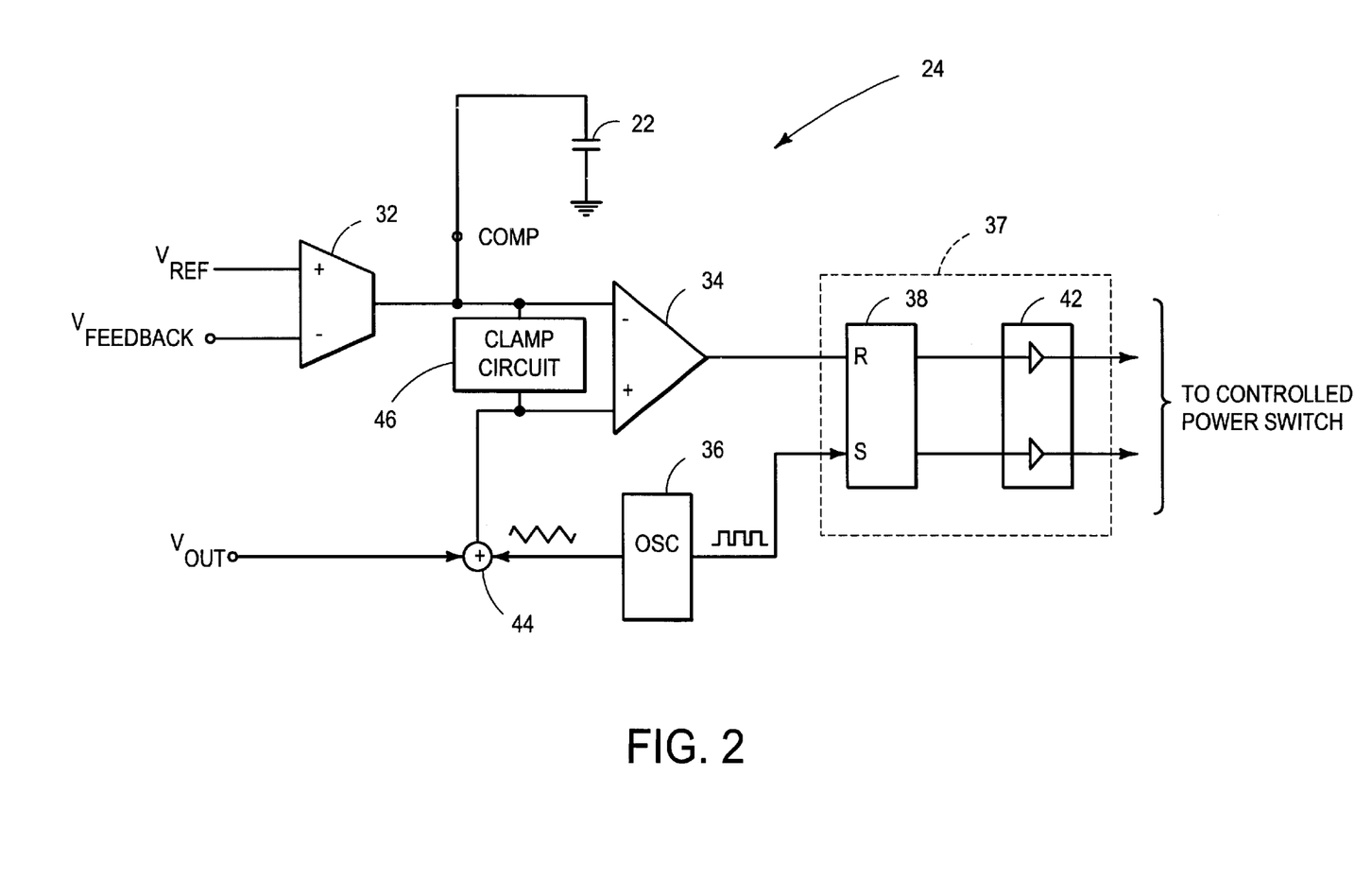
FIG. 2 is a schematic diagram of one embodiment of a portion of a controller circuit for a switch mode power supply.

Turning now to FIG. 2, a more detailed description of a portion of a controller circuit 24 will now be described. This circuit portion of the controller 24 includes an error amplifier 32, a comparator circuit 34, an oscillator 36, a switching control circuit 37 including a latch 38 and a driver circuit 42, a summing circuit 44, and a clamp circuit 46. For illustrative completeness, the physical connection of compensation capacitor 22 is also shown.

The error amplifier 32, which is depicted as a transconductance amplifier, is connected to receive a reference voltage on its non-inverting input and $V_{FEEDBACK}$ on its inverting input. The output of the error amplifier 32 is connected to the compensation capacitor 22 and to the inverting input of the comparator circuit 34. The error amplifier 32 compares the reference voltage and $V_{FEEDBACK}$ and provides a current proportional to the voltage difference, to charge or discharge the compensation capacitor 22.

The comparator circuit 34 is connected to receive a voltage signal from the summing circuit 44 on its non-inverting input and, as discussed above, the output of the error amplifier on its inverting input. The summing circuit 44 sums the $V_{OUT}$ signal with low amplitude ramp voltage that is output from the oscillator 36. The comparator circuit 34 compares the error amplifier output voltage, which is the voltage to which the compensation capacitor is charged, with the output of the summing circuit 44, which is representative of the instantaneous power supply output voltage. When the output of the summing circuit 44 exceeds the error amplifier output voltage, the output of the comparator circuit 34 will be high thus causing the switching control circuit 37 to turn off the controlled power switch 12. The oscillator 36, which also provides a pulse train to the switching control circuit 37 at a set periodicity, will periodically cause the switching control circuit 37 to turn on the controlled power switch 12 at the set periodicity. It should be noted that the ramp signal output from the oscillator 36 is summed with the output voltage signal to improve overall circuit operation when the circuit is operating at duty cycles higher than about 50%. However, the summing circuit 44 and ramp signal are not always necessary for proper circuit operation.

The clamp circuit 46 is connected between the output of the error amplifier 32 and the output of the summing circuit 44. The clamp circuit 46 thus clamps the voltage difference between the error amplifier output and the non-inverting input of the comparator circuit 34 to a predetermined voltage level. Configuring the clamp circuit 46 as such provides an adaptive loop response, since the predetermined voltage level of the clamp circuit 46 is referenced with respect to the summing circuit 44 output, rather than to ground. Thus, the closed loop response of the controller 24 will be consistent regardless of the output voltage since the charge time of the compensation capacitor 22 will be consistently smaller, relative to known controller circuit arrangements.

The clamping circuit described herein allows system designers to use large values for the compensation capacitor 22, which enhances system stability. However, because the voltage level that the capacitor must charge to is maintained at a low level, which adapts to the $V_{OUT}$ voltage level, the slew rate of the system is increased.

Figure 3:
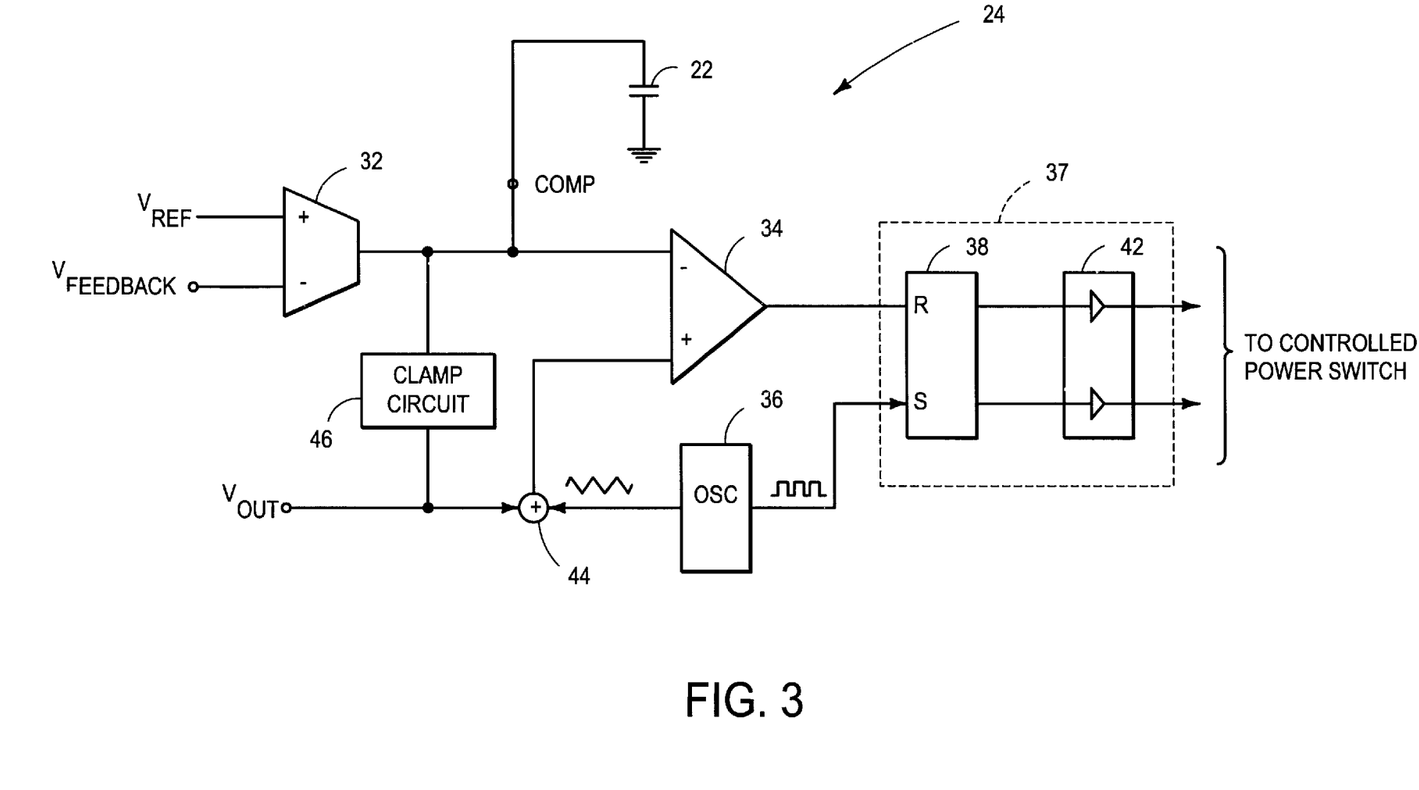
FIG. 3 is a schematic diagram of another embodiment of a portion of a controller circuit for a switch mode power supply.

FIG. 3 depicts another implementation of the controller 24. In this particular implementation, the clamp circuit 46 is connected between the error amplifier 32 output and the $V_{OUT}$ input to the summing circuit 44. Thus, the predetermined voltage level of the clamp circuit 46 is referenced directly with respect to $V_{OUT}$. Hence, the outcome is the same as the embodiment depicted in FIG. 2. Once again, it should be noted that the ramp signal output from the oscillator 36 is summed with the output voltage signal to improve overall circuit operation; however, the summing circuit 44 and ramp signal are not necessary for proper circuit operation.

Figure 4:
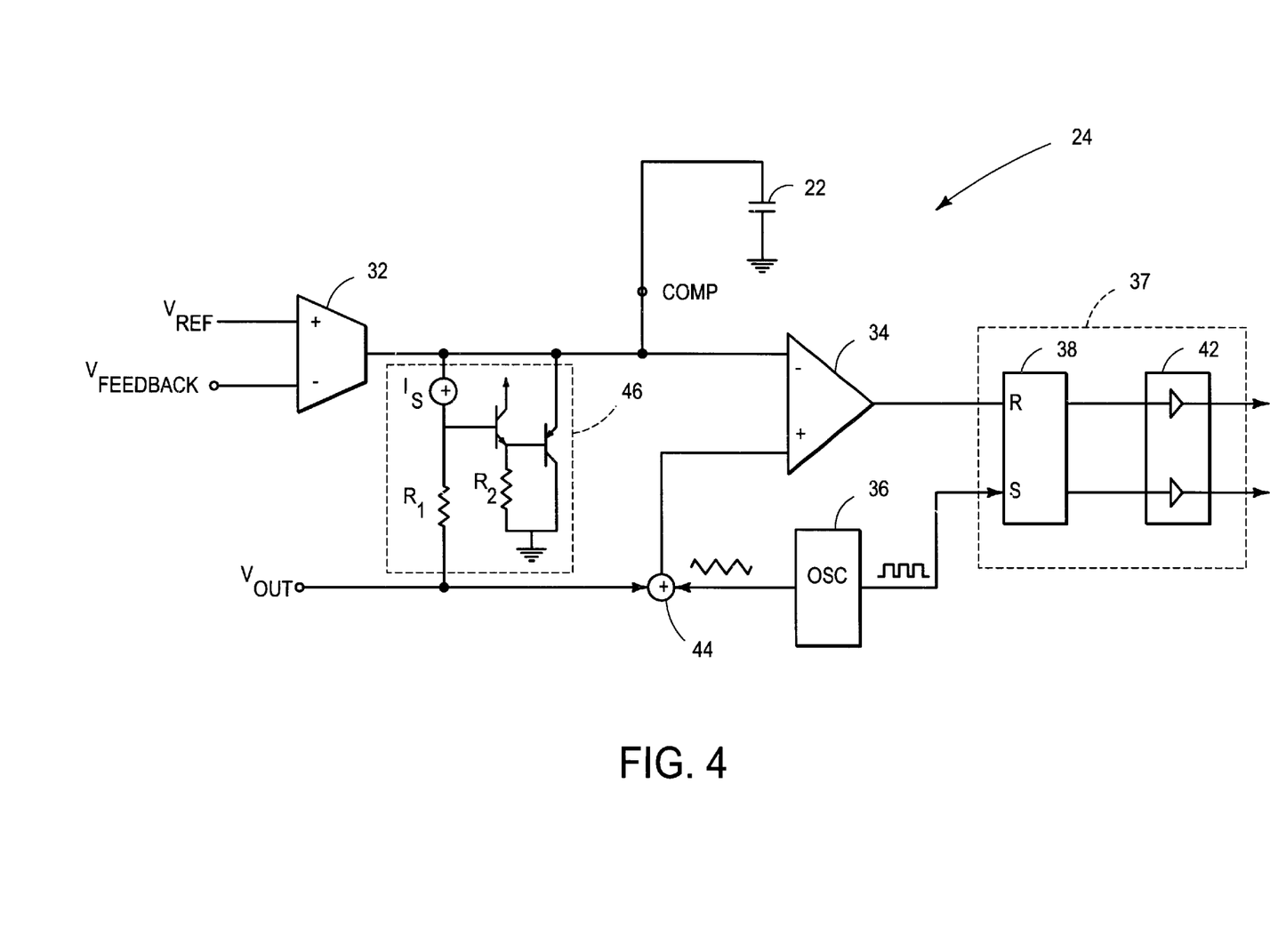
FIG. 4 is a schematic diagram of a specific implementation of a portion of a controller circuit for a switch mode power supply.

FIG. 4 depicts a specific implementation of the arrangement depicted in FIG. 3. The circuit components depicted are the same as those shown in FIG. 2, with like reference numerals being assigned to like components; the only difference between the figures being that a specific circuit implementation of the clamp circuit 46 is provided. As indicated, the clamp circuit 46 is implemented in this embodiment using a bipolar transistor circuit. With this specific implementation, the voltage difference between the error amplifier output and the comparator circuit non-inverting input may be clamped to a voltage magnitude less than a typical voltage drop across the base-emitter junction ($V_{BE}$).

There are numerous and varied circuit configurations for implementing the clamping circuit 46 used to implement the method and apparatus described herein. The bipolar transistor circuit implementation depicted in FIG. 4 is just one of many. By way of non-limiting examples, zener diodes, or biased diodes connected to specific reference voltage sources could also be used.

Figure 5:
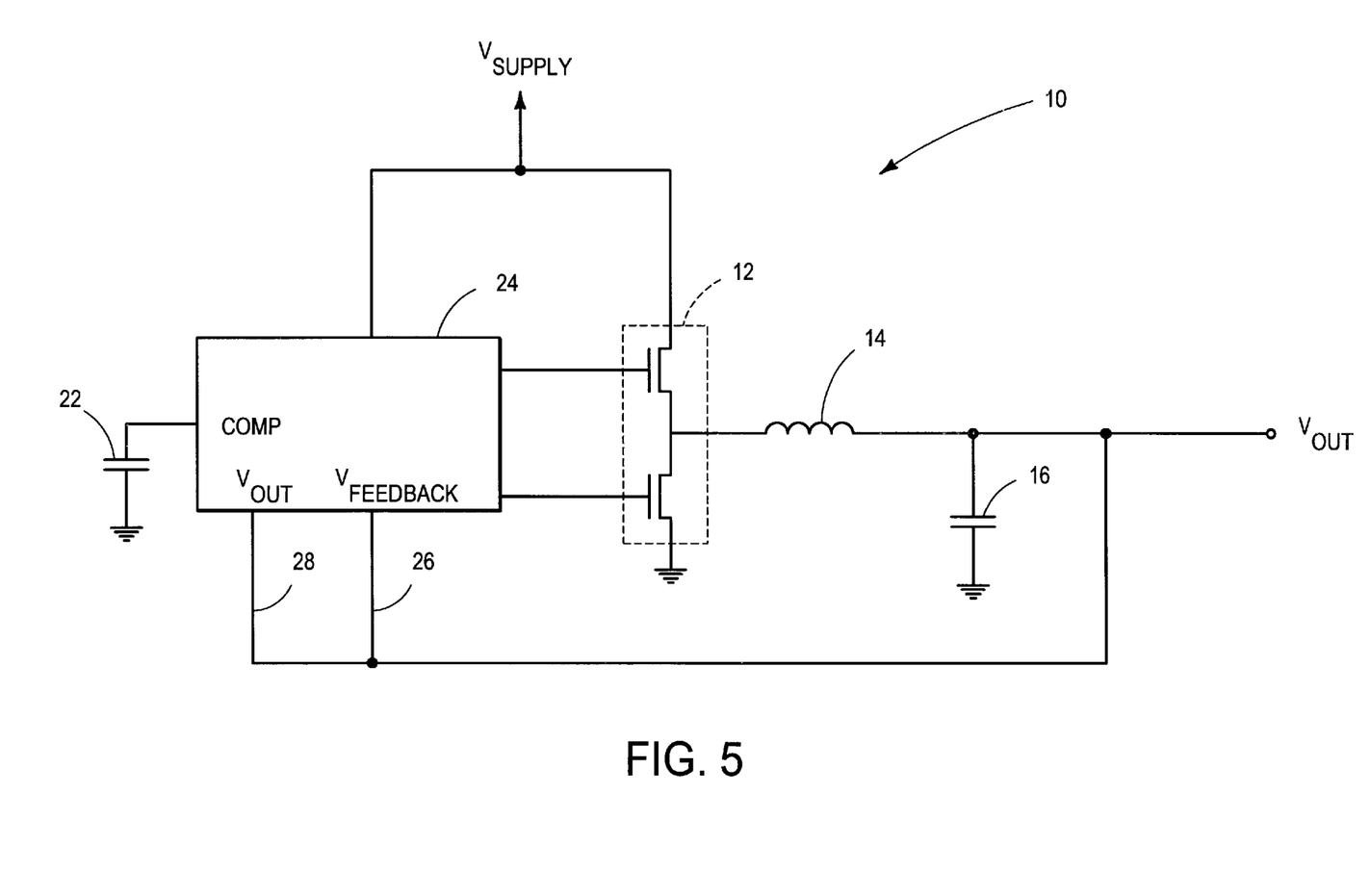
FIG. 5 is a block diagram of another general switch mode power supply.
Figure 6:
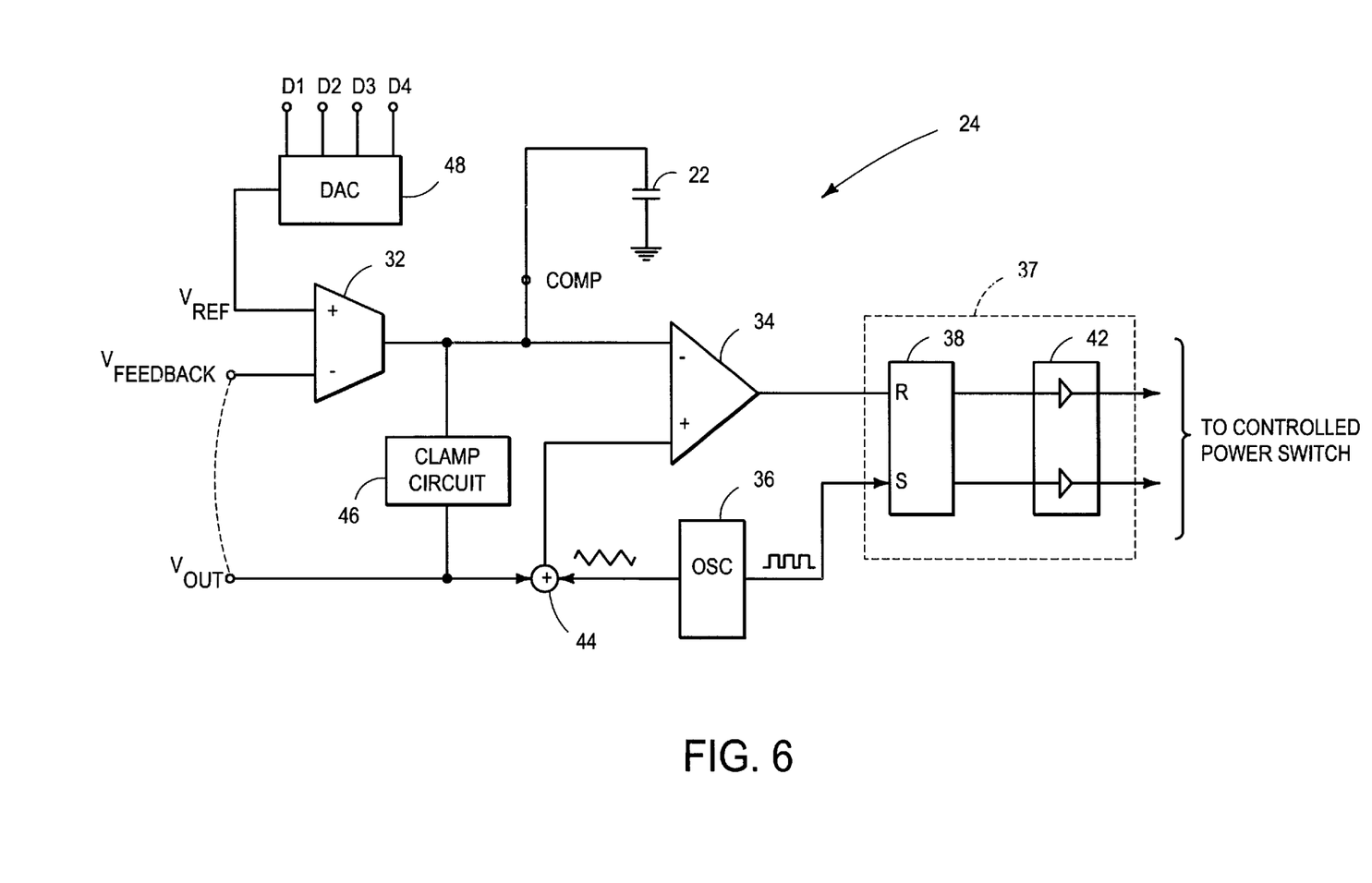
FIG. 6 is a schematic diagram of a futher embodiment of a portion of a controller circuit for a switch mode power supply.
Figure 7:
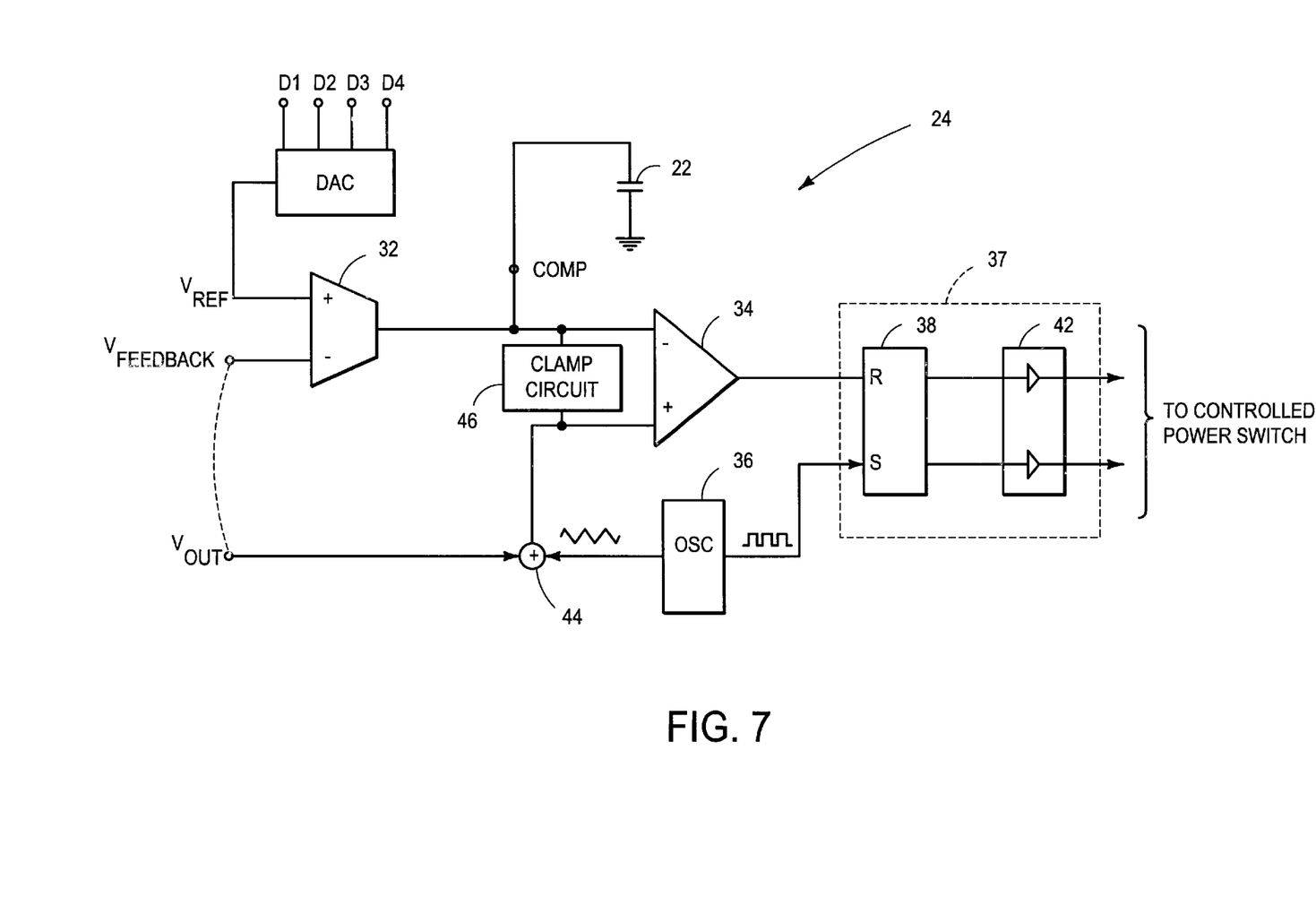
FIG. 7 is a schematic diagram of yet another embodiment of a portion of a controller circuit for a switch mode power supply.

Turning now to FIGS. 5, 6, and 7, another switch mode power supply generalized block diagram, and specific controller circuit implementations are depicted. The circuit components depicted in each of FIGS. 5, 6, and 7 are the same as those shown in FIGS. 1, 2, and 3, respectively, with like reference numerals being assigned to like components. The only difference between FIG. 1 and FIG. 5 is that the feedback voltage line 26 and the output voltage line 28 are both electrically connected to the same point, and thus receive the same voltage signal. The purpose for this arrangement will be discussed more fully below. The differences between FIGS. 2 and 6, and 3 and 7, are that an additional circuit block is included, and the $V_{FEEDBACK}$ and $V_{OUT}$ inputs are shown, in phantom, as being electrically connected together.

With specific reference now to FIGS. 6 and 7, a digital-to-analog converter (DAC) circuit 48 is connected to the non-inverting input of the error amplifier 32. The DAC circuit 48 allows the reference voltage provided to the non-inverting input the error amplifier 32 to be programmed to a desired, predetermined value based on the binary inputs to the DAC circuit 48 input pins (shown for convenience as D1–D4). Additionally, as stated above, the $V_{FEEDBACK}$ and $V_{OUT}$ inputs are electrically connected to the same point. This configuration is utilized when the power supply 10 is being used to supply power for applications using high-end microprocessors. This is because these applications require automatic voltage adjustment per the individual microprocessor.

Although depicted as separate and distinct implementations, the control circuits 24 depicted in FIGS. 2 and 3 could also be implemented using the DAC circuit 48 to provide the reference voltage to the error amplifier 32. Similarly, the control circuits 24 depicted in FIGS. 6 and 7 need not be implemented using the DAC circuit 48. Instead, a fixed, predetermined reference voltage could be provided to the error amplifier 32 non-inverting input.

What is claimed is:

1. In a switch mode power supply controller circuit including at least first and second inputs for receiving, respectively, first and second feedback voltages representative of the power supply output voltage, and an output supplying a gate drive signal, a method of providing a loop response for the controller that is adaptive to an output voltage of the power supply, the method comprising:

comparing the first feedback voltage to a predetermined reference voltage to produce an error voltage;

summing the second feedback voltage with a second predetermined voltage signal to generate a summed voltage signal; and clamping a difference between the error voltage and the summed voltage signal to a first predetermined voltage level.

2. The method of claim 1, further comprising:

comparing the error voltage to the summed voltage signal to generate a control signal for use in producing the gate drive signal.

3. The method of claim 1, further comprising:

generating the predetermined reference voltage with a digital-to-analog converter circuit.

4. A switch mode power supply controller circuit having a loop response that is adaptive to an output voltage of the switch mode power supply, the controller including at least first and second inputs for receiving, respectively, first and second feedback voltages each of which is representative of the power supply output voltage, and an output supplying a gate drive signal, said controller circuit comprising:

an error amplifier circuit including at least (i) a first input portion coupled to a reference voltage source (ii) a second input portion coupled to receive the first feedback voltage and (iii) an output portion;

a comparator circuit including at least (i) a first input portion coupled to said error amplifier output portion (ii) a second input portion and (iii) an output portion; and a clamping circuit coupled between said error amplifier output portion and said comparator circuit second input portion.

5. The controller circuit of claim 4, further comprising:
an energy storage device coupled to said error amplifier output portion.

6. The controller circuit of claim 4, further comprising:
a summing circuit including (i) a first input portion coupled to receive the second feedback voltage (ii) a second input portion coupled to receive a predetermined voltage signal of a specified periodicity and (iii) an output portion coupled to said comparator circuit second input portion.

7. The controller circuit of claim 6, further comprising:
an oscillator circuit, including a first output portion coupled to said summing circuit second input portion, generating the predetermined voltage signal.

8. The controller circuit of claim 7, further comprising:
switching control circuit including (i) an output portion (ii) a first input portion coupled to said comparator circuit output portion and (iii) a second input portion coupled to a second output portion of said oscillator circuit, wherein a state of said switching control circuit output portion is controlled by said comparator circuit output portion and said oscillator second output portion.

9. The controller of claim 4, wherein the reference voltage coupled to said error amplifier first input portion comprises a digital-to-analog converter circuit.

10. The controller circuit of claim 4, wherein said clamping circuit comprises a bipolar transistor circuit including:
a first transistor having an emitter terminal coupled to said error amplifier output portion, a base terminal, and a collector terminal coupled to a reference potential;
a second transistor having a base terminal coupled to a current source, a collector terminal coupled to a voltage source, and an emitter terminal coupled to the base terminal of said first transistor;
a first resistor coupled between the base terminal of said second transistor and said comparator circuit second input; and
a second resistor coupled between the emitter terminal of said second transistor and the reference potential.

11. A switch mode power supply controller circuit having a loop response that is adaptive to an output voltage of the switched mode power supply, the controller including at least first and second inputs for receiving, respectively, first and second feedback voltages each of which are representative of the power supply output voltage, and an output supplying a gate drive signal, said controller circuit comprising:
an error amplifier circuit including at least (i) a first input portion coupled to a reference voltage source (ii) a second input portion coupled to receive the first feedback voltage and (iii) an output portion;
a comparator circuit including at least (i) a first input portion coupled to said error amplifier output portion (ii) a second input portion and (iii) an output portion;
a summing circuit including (i) a first input portion coupled to receive the second feedback voltage (ii) a second input portion coupled to receive a predetermined voltage signal of a specified periodicity and (iii) an output portion coupled to said comparator circuit second input portion; and
a clamping circuit coupled between said error amplifier output portion and said summing circuit first input portion.

12. The controller of claim 11, wherein the reference voltage coupled to said error amplifier first input portion comprises a digital-to-analog converter circuit.

13. The controller of claim 11, wherein said clamping circuit comprises a bipolar transistor circuit including:
a first transistor having an emitter terminal coupled to said error amplifier output portion, a base terminal, and a collector terminal coupled to a reference potential;
a second transistor having a base terminal coupled to a current source, a collector terminal coupled to a voltage source, and an emitter terminal coupled to the base terminal of said first transistor;
a first resistor coupled between the base terminal of said second transistor and said comparator circuit second input; and
a second resistor coupled between the emitter terminal of said second transistor and the reference potential.

14. The controller of claim 11, further comprising:
an energy storage device coupled to said error amplifier output portion.

15. The controller of claim 11, further comprising:
an oscillator circuit, including a first output portion coupled to said summing circuit second input portion, generating the predetermined voltage signal.

16. The controller of claim 15, further comprising:
a switching control circuit including (i) an output portion (ii) a first input portion coupled to said comparator circuit output portion and (iii) a second input portion coupled to a second output portion of said oscillator circuit,
wherein a state of said switching control circuit output portion is controlled by said comparator circuit output portion and said oscillator second output portion.

17. In a switch mode power supply controller circuit including at least first and second inputs for receiving, respectively, first and second feedback voltages each of which is representative of the power supply output voltage, and an output supplying a gate drive signal, a method of providing a loop response for the controller that is adaptive to the output voltage of the power supply, the method comprising:
comparing the first feedback voltage to a predetermined reference voltage to produce an error voltage; and
clamping a difference between the error voltage and the second feedback voltage to a first predetermined voltage level.

18. The method of claim 17, further comprising:
generating the predetermined reference voltage with a digital-to-analog converter circuit.

19. The method of claim 17, further comprising:
comparing the error voltage to the second feedback voltage to generate a control signal for use in producing the gate drive signal.

20. The method of claim 17, further comprising:
summing the second feedback voltage with a second predetermined voltage signal to generate a summed voltage signal; and
comparing the summed voltage signal to the error voltage to generate a control signal for use in producing the gate drive signal.

* * * * *